US011376664B2

(12) United States Patent
Park et al.

(10) Patent No.: US 11,376,664 B2
(45) Date of Patent: Jul. 5, 2022

(54) METHOD TO CONTROL THE SIZES OF THE CORE-SHELL NANOPARTICLES

(71) Applicant: KOREA INSTITUTE OF ENERGY RESEARCH, Daejeon (KR)

(72) Inventors: Gu-gon Park, Daejeon (KR); Hyun-uk Park, Seoul (KR); Won-yong Lee, Daejeon (KR); Sung-dae Yim, Daejeon (KR); Min-jin Kim, Daejeon (KR); Young-jun Sohn, Daejeon (KR); Byungchan Bae, Daejeon (KR); Seung-gon Kim, Daejeon (KR); Dongwon Shin, Sejong-si (KR); Hwanyeong Oh, Daejeon (KR); Seung Hee Woo, Daejeon (KR); So Jeong Lee, Daejeon (KR); Hyejin Lee, Daejeon (KR); Yoon Young Choi, Sejong-si (KR); Seok-hee Park, Daejeon (KR); Tae-hyun Yang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 39 days.

(21) Appl. No.: 16/916,974

(22) Filed: Jun. 30, 2020

(65) Prior Publication Data

US 2021/0170488 A1  Jun. 10, 2021

(30) Foreign Application Priority Data

Dec. 10, 2019 (KR) .................. 10-2019-0163861

(51) Int. Cl.
*B22F 9/24* (2006.01)
*B22F 9/04* (2006.01)
(Continued)

(52) U.S. Cl.
CPC .............. *B22F 9/04* (2013.01); *B22F 1/07* (2022.01); *B22F 1/14* (2022.01); *B22F 9/24* (2013.01);
(Continued)

(58) Field of Classification Search
None
See application file for complete search history.

(56) References Cited

U.S. PATENT DOCUMENTS

| 2011/0129763 A1* | 6/2011 | Lee ......................... B22F 9/24 429/532 |
| 2016/0197358 A1* | 7/2016 | Arihara ............... H01M 4/8882 429/482 |
| 2019/0198885 A1* | 6/2019 | Kuttiyiel ............ H01M 4/8657 |

OTHER PUBLICATIONS

Cheng et al., "Extremely stable platinum nanoparticles encapsulated in a zirconia nanocage by area-selective atomic layer deposition for the oxygen reduction reaction," Advanced Materials (2015), vol. 27, pp. 277-281.

(Continued)

*Primary Examiner* — George Wyszomierski
(74) *Attorney, Agent, or Firm* — Birch, Stewart, Kolasch & Birch, LLP

(57) ABSTRACT

The present disclosure is related to a method to control sizes of core-shell nanoparticles comprising the steps of: manufacturing slurry by irradiating ultrasonic waves to a dispersion solution containing a reducing solvent, a carbon support, a transition metal precursor and a precious metal precursor; manufacturing a solid by filtering the manufactured slurry, followed by washing and drying; and manufacturing a nanoparticle of a transition metal core and a platinum shell by heat-treating the dried solid at a temperature of 450 to 900° C. and a pressure of 1 to 90 bar for 0.5 to 10 hours under $N_2$ atmosphere.

7 Claims, 7 Drawing Sheets

(51) Int. Cl.
*B22F 1/07* (2022.01)
*B22F 1/14* (2022.01)
*B82Y 40/00* (2011.01)
*B82Y 30/00* (2011.01)

(52) U.S. Cl.
CPC ....... *B22F 2201/02* (2013.01); *B22F 2202/11* (2013.01); *B22F 2203/00* (2013.01); *B22F 2301/10* (2013.01); *B22F 2301/15* (2013.01); *B22F 2301/20* (2013.01); *B22F 2301/35* (2013.01); *B22F 2304/054* (2013.01); *B22F 2998/10* (2013.01); *B82Y 30/00* (2013.01); *B82Y 40/00* (2013.01)

(56) References Cited

OTHER PUBLICATIONS

Galeano et al., "Toward highly stable electrocatalysts via nanoparticle pore confinement," Journal of the American Chemical Society (2012), vol. 134, pp. 20457-20465.

Guo et al., "Embedding Pt Nanocrystals in N-Doped Porous Carbon/Carbon Nanotubes toward Highly Stable Electrocatalysts for the Oxygen Reduction Reaction," ACS Catalysis (2015), vol. 5, pp. 2903-2909.

Jung et al., "Organic-inorganic hybrid PtCo nanoparticle with high electrocatalytic activity and durability for oxygen reduction," NPG Asia Materials (2016), vol. 8, pp. 1-10.

* cited by examiner

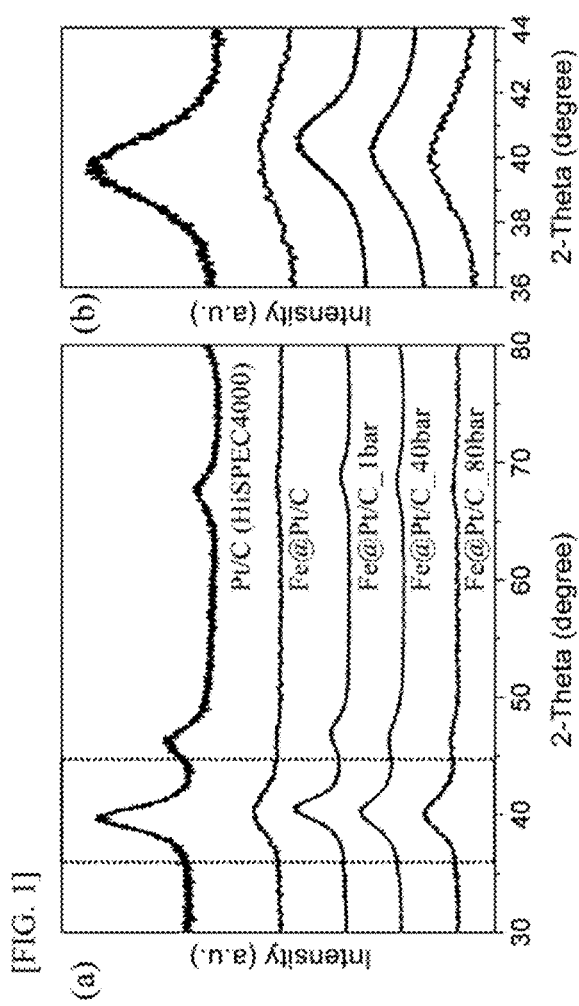

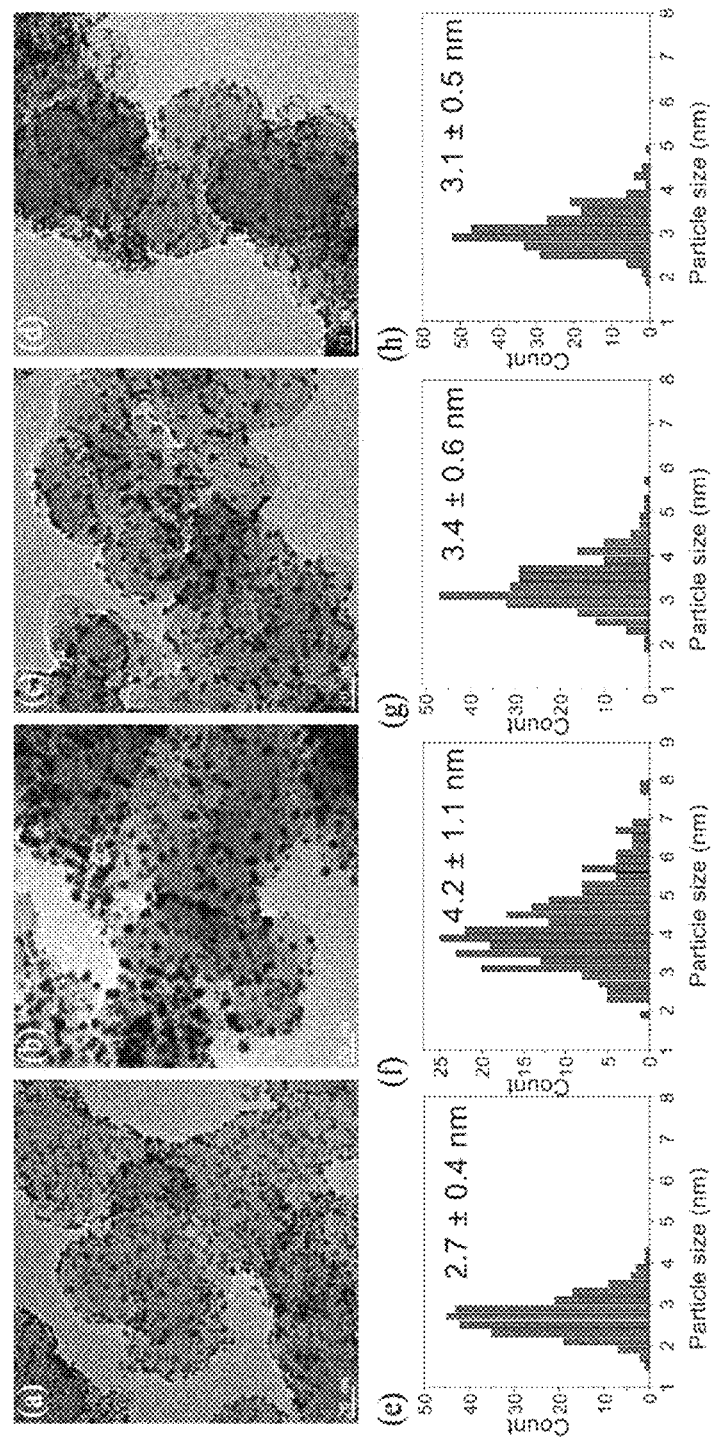
[FIG. 2]

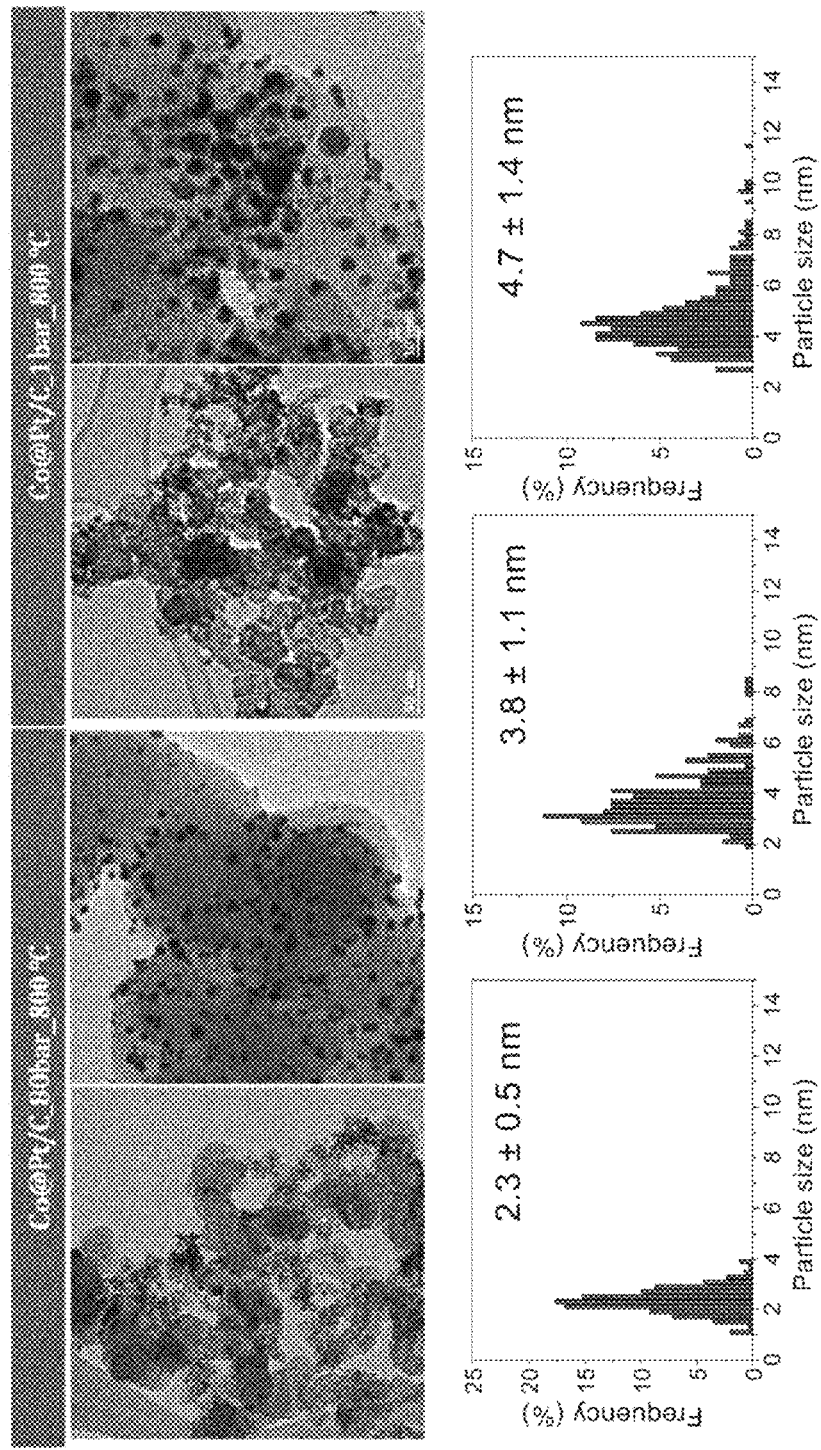
[FIG. 3]

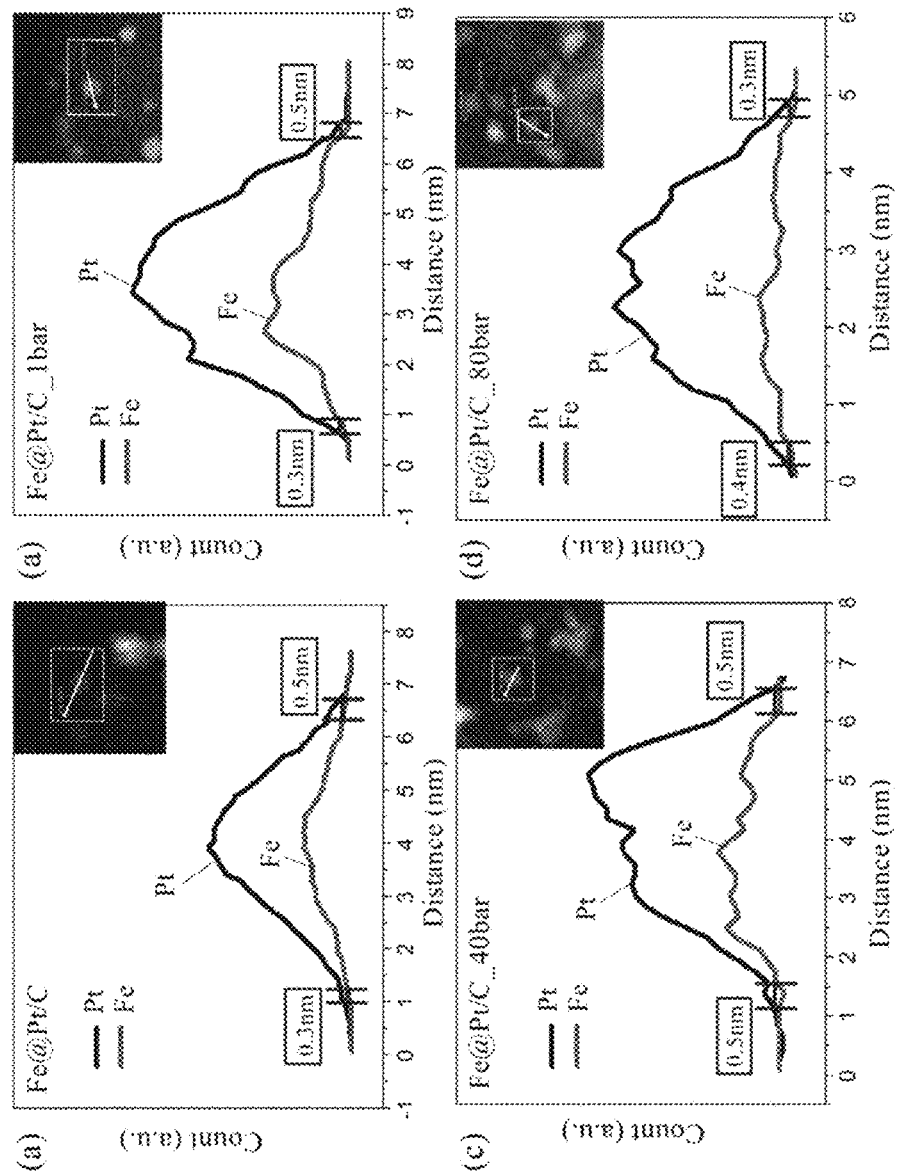
[FIG. 4]

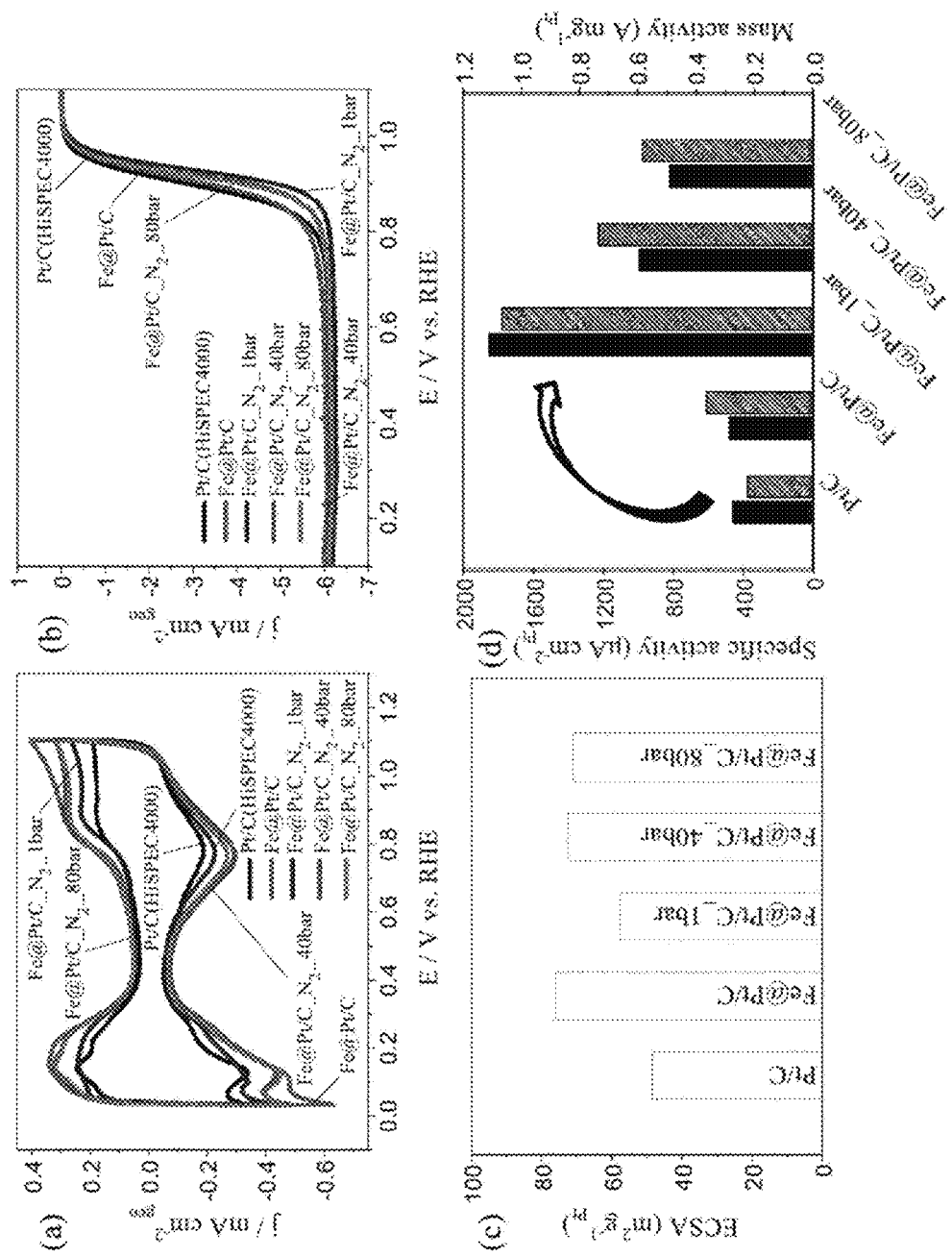
[FIG. 5]

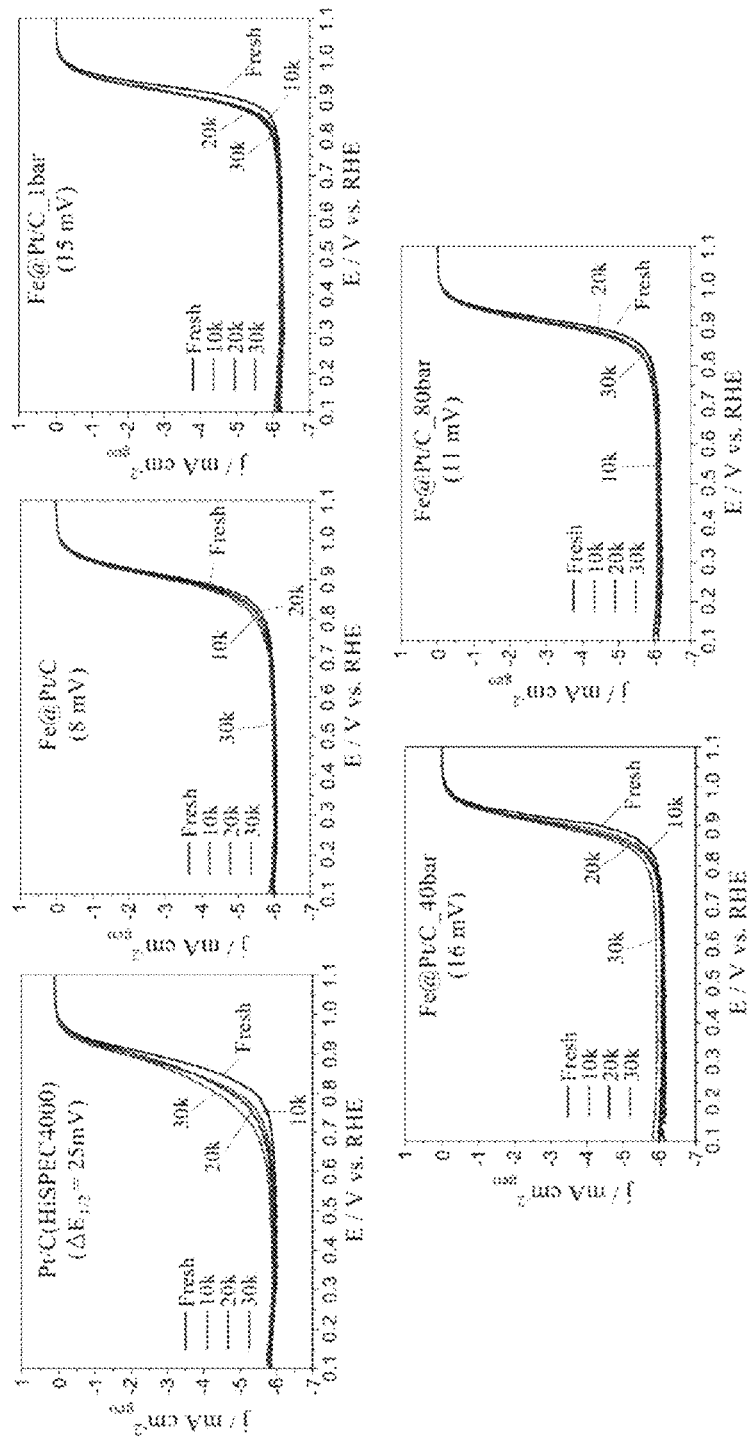
[FIG. 6]

[FIG. 7]
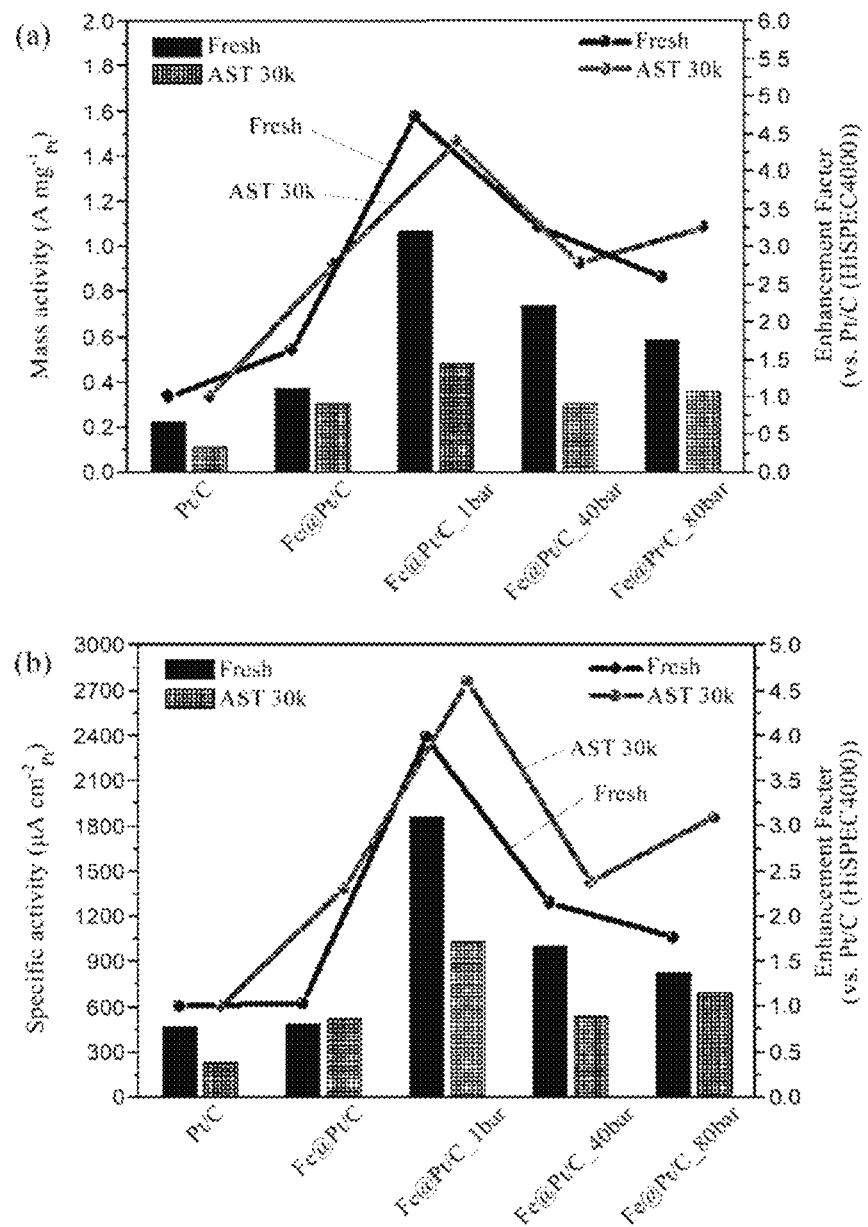

METHOD TO CONTROL THE SIZES OF THE CORE-SHELL NANOPARTICLES

CROSS-REFERENCE TO RELATED APPLICATIONS

This application is claims the priority of Korean Patent Application No. 10-2019-0163861, in the Korean Intellectual Property Office, the disclosure of which is incorporated herein by reference in their entirety.

BACKGROUND

Technical Field

The present disclosure is related to a method to control sizes of core-shell nanoparticles by controlling pressure conditions when performing the heat-treatment.

Related Art

In general, the fuel cell is in the limelight of a next-generation energy source, which is a device directly converting chemical energy generated by oxidation/reduction of fuel into electric energy. Recently, it has been expected as promising future electric power for transportation, such as the electric vehicle, and for domestic power supply. The electrode reaction in the fuel cell consists of the hydrogen oxidation reaction dominating at the anode and the oxygen reduction reaction dominating at the cathode. In order to make these electrochemical reactions dominate in the fuel cell system, such as the polymer electrolyte membrane fuel cell and etc., driven at a low temperature, reaction rates are supposed to be increase effectively.

For the aforesaid reason, the conventional fuel cell system necessarily uses platinum (Pt) which is a kind of precious metal catalysts. The platinum catalyst shows superior energy converting efficiency. Notwithstanding, Pt is a finite resource and the price thereof is very high, thus possibly impeding the widespread commercialization of the fuel cell. In particular, in terms of problems related to the Polymer electrolyte membrane fuel cell (PEMFC), the demand for high efficient and low cost of novel electrochemical catalysts has become the most pressing problem.

In order to solve the aforementioned problems and to accelerate the commercialization of the fuel cell, studies for multi-component nanoparticles containing multiple components, such as alloy nanoparticles and core-shell nanoparticles have been made recently, so as to replace the existing Pt electrode supported onto a carbon support. Such a method necessarily involves the heat-treatment process in order to manufacture stabilized alloy nanoparticles. However, during the heat-treatment process at a high temperature, sizes of the nanoparticles grow, thus decreasing an active region.

Thus, in order to suppress growing in the sizes of the nanoparticles, various methods for forming protective layers onto the nanoparticles using inorganic or organic compounds, prior to performing the heat-treatment process at a high temperature. However, such a method requires a complicated, multi-step process additionally in order to remove the used inorganic or organic compounds following the heat-treatment process, thus showing its limit when applied to the mass production.

RELATED ART DOCUMENT

Non-Patent Document (Non-patent Document 0001) N. Cheng, M. N. Banis, J. Liu, A. Riese, X. Li, R. Li, S. Ye, S. Knights, X. Sun, Extremely stable platinum nanoparticles encapsulated in a zirconia nanocage by area-selective atomic layer deposition for the oxygen reduction reaction, Advanced materials, 27 (2015) 277-281.

(Non-patent Document 0002) C. Galeano, J. C. Meier, V. Peinecke, H. Bongard, I. Katsounaros, A. A. Topalov, A. Lu, K. J. Mayrhofer, F. Schuth, Toward highly stable electrocatalysts via nanoparticle pore confinement, Journal of the American Chemical Society, 134 (2012) 20457-20465.

(Non-patent Document 0003) L. Guo, W.-J. Jiang, Y. Zhang, J.-S. Hu, Z.-D. Wei, L.-J. Wan, Embedding Pt Nanocrystals in N-Doped Porous Carbon/Carbon Nanotubes toward Highly Stable Electrocatalysts for the Oxygen Reduction Reaction, ACS Catalysis, 5 (2015) 2903-2909.

(Non-patent Document 0004) N. Jung, S. Bhattacharjee, S. Gautam, H.-Y. Park, J. Ryu, Y.-H. Chung, S.-Y. Lee, I. Jang, J. H. Jang, S. H. Park, D. Y. Chung, Y.-E. Sung, K.-H. Chae, U. V. Waghmare, S.-C. Lee, S. J. Yoo, Organic-inorganic hybrid PtCo nanoparticle with high electrocatalytic activity and durability for oxygen reduction, NPG Asia Materials, 8 (2016) e237-e237.

SUMMARY

Technical Problem

Therefore, in order to solve the aforementioned problems, in an embodiment in accordance with the present disclosure, provided is a method to control sizes of core-shell nanoparticles which have a small size without growth of the particles after the heat-treatment process and show superior dispersion and uniformity.

Further, in another embodiment in accordance with the present disclosure, a method to control sizes of core-shell nanoparticles is provided which does not adopt inorganic or organic compounds used as the conventional protective layers, thus requiring no complicated post-treatment process for removing the protective layers.

Meanwhile, technical objects to be achieved in the present disclosure are not limited to the aforementioned technical objects, and other technical objects, which are not mentioned above, will be apparently understood to a person having ordinary skill in the art from the following description.

Technical Solution

According to a first aspect of the present disclosure, a method to control sizes of core-shell nanoparticles may include the steps of: manufacturing slurry by irradiating ultrasonic waves to a dispersion solution containing a reducing solvent, a carbon support, a transition metal precursor and a precious metal precursor; manufacturing a solid by filtering the manufactured slurry, followed by washing and drying; and manufacturing a nanoparticle of a transition metal core and a platinum shell by heat-treating the dried solid at a temperature of 450 to 900° C. and a pressure of 1 to 90 bar for 0.5 to 10 hours under $N_2$ atmosphere.

According to another aspect of the present disclosure, the transition metal may be selected from the group consisting of nickel, manganese, chromium, copper, molybdenum, iron and cobalt.

According to another aspect of the present disclosure, an average particle size of the core-shell nanoparticles may be 3 to 5 nm, a mass activity is 0.52 to 1.2 A/mgPGM, and a specific activity may be 800 to 200 $\mu A \cdot cm^{-2}$.

According to another aspect of the present disclosure, the core-shell nanoparticles may have a Half-wave potential of 910 to 930 mV verified by Linear Sweep Voltammograms (LSV) around 30 k cycles of Accelerated Stress Testing (AST), the AST may measure time for being repeated at a voltage of 0.6V for 3 seconds and 0.95V for 3 seconds respectively during 30K cycles, and the LSV may be measured at a scan speed of 10 mV S-1 ND and a rotational speed of 1600 rpm in a potential range of 0.0 to 1.1V (vs. RHE) in $O^{2-}$ saturated 0.1 M $HClO_4$.

According to another aspect of the present disclosure, an average particle size of the core-shell nanoparticles may be 3 to 4.5 nm.

According to another aspect of the present disclosure, the reducing solvent may have reducing power at a temperature of 70° C. or higher.

According to another aspect of the present disclosure, the ultrasonic wave may be performed for 2 to 4 hours, using an amplitude of 40%, a 13 mm solid probe an ultrasonic processor of 20 kHz.

Advantageous Effects

According to the present disclosure, a method to control sizes of core-shell nanoparticles is capable of providing core-shell nanoparticles which have superior stability (durability), dispersion and uniformity and of which an average particle diameter is small, due to the heat-treatment process.

Further, according to the present disclosure, a method for control the sizes of core-shell nanoparticles involve no complicated post-treatment process for removing protective layers, thus allowing the manufacture method of nanoparticles to be uncomplicated, easy and economically advantageous.

Therefore, the uncomplicated process according to the present disclosure is capable of providing core-shell nanoparticles of which an average particle diameter is small and uniform and which have superior stability (durability), thus allowing being obtained massively and of being adopted to the industrial settings more easily.

Meanwhile, advantageous effects to be obtained in the present disclosure are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

FIG. 1 depicts the X-ray diffraction (XRD) of the core-shell nanoparticles manufactured in embodiments 1 to 3 and comparative examples 1 to 2 according to the present disclosure.

FIG. 2 depicts the transmission electron microscopy (TEM) showing the sizes of the core-shell nanoparticles manufactured in embodiments 1 to 3 and comparative example 2 according to the present disclosure, and the particle uniformity and dispersion thereof.

FIG. 3 depicts the transmission electron microscopy (TEM) showing the sizes of the core-shell nanoparticles manufactured in embodiments 4 to 5 and comparative example 3 according to the present disclosure, and particle uniformity and dispersion thereof.

FIG. 4 depicts the scanning transmission electron microscopy (STEM) and energy dispersive spectrometry (EDS) of the core-shell nanoparticles manufactured in embodiments 1 to 3 and comparative example 2 according to the present disclosure.

FIG. 5 depicts the specific activity, mass activity and electrochemically active surface area (ECSA) of the core-shell nanoparticles manufactured in embodiments 1 to 3 and comparative examples 1 to 2 according to the present disclosure.

FIG. 6 depicts the Linear Sweep Voltammograms (LSV) of the core-shell nanoparticles manufactured in embodiments 1 to 3 and comparative examples 1 to 2 according to the present disclosure around 30 k cycles of Accelerated Stress Testing (AST).

FIG. 7 depicts the specific activity and mass activity of the core-shell nanoparticles manufactured in embodiments 1 to 3 and comparative examples 1 to 2 according to the present disclosure around 30 k cycles of Accelerated Stress Testing (AST).

DETAILED DESCRIPTION

Description of Embodiments

Hereinafter, embodiments of the present disclosure will be explained in detail with reference to the accompanying drawings in order to be easily implemented by those having ordinary knowledge in the art to which the present disclosure pertains. However, the following detailed description merely delineates the embodiments for structural or functional explanation of the present disclosure. Thus, it should be not interpreted that the scope of the present disclosure is limited to the embodiments explained in the specification. That is, since the embodiments are able to be modified variously and have a variety of form, it should be understood that the scope of the present disclosure include equivalents capable of implementing the technical idea. Further, the objects or effects provided in the present disclosure do not mean that a particular embodiment includes either all of them or such effects only. Thus, it should be not understood that the scope of the present disclosure is limited thereto.

The terms used in the present disclosure should be understood as the followings.

Since the terms, such as "first", "second", etc., are used for distinguish one element from other elements, the scope of the present disclosure should be not limited thereto. For example, "a first element' may be referred to as "a second element" and similarly hereto, "a second element" may be referred to as "a first element". When mentioning that an element is "connected" to the other element, it may be connected directly thereto, however, it should be understood that there may be another element between them. Whereas, when mentioning that an element is "connected directly" to the other element, it should be understood that there may be not any other element between them. Meanwhile, it should be also understood in the same way as the above in case of expressions for explaining the relationship between elements, i.e. "between~" and "directly between~", or "adjacent to~" and "adjacent directly to~".

It should be understood that the singular expression includes the plural expression unless specifically stated otherwise. The terms, such as "comprise" and "have", etc., indicate the existences of the implemented features, numbers, steps, operations, elements, components or any of combinations thereof. It should be understood that they do not preclude the potential existences or additions of one or more features, numbers, steps, operations, elements, components or any of combinations thereof.

Unless otherwise defined, all terms used herein have the same meanings as those commonly understood by those having ordinary knowledge in the art to which the present disclosure pertains. It should be understood that the terms defined in commonly used dictionaries, should be interpreted to be consistent with the meanings contextually stated in the field of relevant art and will not be interpreted to have idealized or excessively formalistic senses unless explicitly defined in the present disclosure.

The present disclosure is related to a method to control sizes of core-shell nanoparticles by controlling pressure conditions when performing a heat-treatment process, in which the sonochemical method consists of a core-shell nanoparticle manufacture process and a heat-treatment process at a high temperature for increasing the stability of the manufactured nanoparticles.

Particularly, the method to control sizes of core-shell nanoparticles according to the present disclosure may include the steps of: manufacturing slurry by irradiating ultrasonic waves to a dispersion solution containing a reducing solvent, a carbon support, a transition metal precursor and a precious metal precursor; manufacturing a solid by filtering the manufactured slurry, followed by washing and drying; and manufacturing a nanoparticle of a transition metal core and a platinum shell by heat-treating the dried solid at a temperature of 450 to 900° C. and a pressure of 1 to 90 bar for 0.5 to 10 hours under $N_2$ atmosphere.

Hereafter, described is the method to control sizes of core-shell nanoparticles according to the present disclosure, step by step as follows.

Firstly, slurry is manufactured by irradiating ultrasonic waves to a dispersion solution containing a reducing solvent, a carbon support, a transition metal precursor and a precious metal precursor. The high frequency oscillation of the ultrasonic waves creates bubbles within a cavity, thus resulting in oscillatory growth, and finally exploding the cavity after reaching a specific size. These consecutive procedures caused by the ultrasonic irradiation are referred to 'acoustic cavitation mechanism'. A huge amount of heat energy approximating about 5,000K may be induced from the cavity explosion occurred at the final step of the acoustic cavitation mechanism and the extinction thereof will be made within an extremely short period of time of $10^{-6}$ seconds.

In the chemical reaction which ultrasonic irradiation is grafted onto, if reactants are two or more materials having different vapor pressures, rates for evaporating the two or more reactants to bubbles by the high frequency oscillation of the ultrasonic waves become different from each other, thus allowing controlling structural and electrochemical features of resulted materials from the reaction using the same. For example, if manufacturing nanoparticles containing two or more metals by irradiating the ultrasonic waves using the two or more metal precursors as a reactant, the dispersion of the two or more metal elements may be controlled within the nanoparticles according to differences in vapor pressures of the two or more metal precursors. For example, a metal precursor having a low vapor pressure is positioned in a shell portion while a metal precursor having a high vapor pressure is positioned in a core portion within the nanoparticles, so as to allow obtaining core-shell structure nanoparticles in which the dispersion of elements was controlled.

For example, the present disclosure may perform the ultrasonic irradiation using an amplitude of 40%, a 13 mm solid probe and an ultrasonic processor.

The reducing solvent commonly used in the art may use organic materials without moisture and an oxygen source. Particularly, it may be a solvent having reducing power at a temperature of 70° C. or higher. More particularly, it may be a solvent having reducing power at a temperature of 70 to approximately 400° C., for example, being at least one ethylene glycol selected from the group consisting of di-ethylene glycol, tri-ethylene glycol and poly-ethylene glycol. This reducing solvent performs reducing the metal precursor that is a reactant within the cavity formed by the ultrasonic treatment and forming an external liquid environment where the creation and extinction of the cavity occur by maintaining a high boiling temperature.

The precious metal precursor has a lower vapor pressure compared to a transition metal precursor and uses one which is capable of contributing to the galvanic replacement reaction after forming a transition metal seed particle and increasing the size thereof. Particularly, the precious metal precursor commonly used in the art may be at least one selected from the group consisting of an acetylacetonate precursor of the precious metal, a hexafluoroacetylacetonate precursor of the precious metal and a pentafluoroacetylacetonate precursor of the precious metal, notwithstanding specifically limited.

The transition metal precursor commonly used in the art may be at least one selected from the group consisting of precursors of nickel, manganese, chromium, copper, molybdenum, iron and cobalt, notwithstanding specifically limited. For example, the transition metal precursor may be at least one selected from the group consisting of an acetylacetonate precursor of the transition metal, and a hexafluoroacetylacetonate precursor of the transition metal. This transition metal precursor is volatilized rapidly by a high vapor pressure and captured in the cavity formed by the ultrasonic waves, thus allowing the transition metal to be positioned in the core portion in the core-shell structure that is a reaction product.

The carbon support is, as a support of the core-shell nanoparticles, commonly used in the art not being specifically limited. For example, a porous carbon support may be used. If using the porous carbon support, more amounts of the core-shell structure nanoparticles may be supported efficiently by a large surface area.

This above, metal oxides may be used allowing support the core-shell structure nanoparticles.

The reaction may maintain a reaction temperature of 70 to 200° C. by heats generated by the ultrasonic irradiation, this meaning that the reaction temperature is formed naturally by the heats due to the ultrasonic irradiation without a separate heating process.

The cavity is formed by irradiating the ultrasonic waves according to the present disclosure, and the transition metal precursor is captured in the cavity earlier than the precious metal precursor due to the difference in the vapor pressures, thus forming a core. Particularly, the transition precursor is volatilized earlier than the precious metal precursor, then being captured in cavity formed by the ultrasonic irradiation first. Then, the precious metal precursor is deposited on the core, thus forming a shell.

The core-shell catalyst according to the present disclosure positions the transition metal in the core portion, thus decreasing the unit cost of the electrode catalyst, and the precious metal positioned in the shell portion has high stability, thus allowing extending the lifespan of the electrode catalyst. An iron or cobalt core and a platinum shell are preferred among a variety of the transition metals and precious metals.

Next, the solid is manufactured by filtering the manufactured slurry, followed by washing and drying. The filtration and washing processes are commonly performed in the art and for example, the washing process is performed with a membrane filer using ethanol and deionized water, notwithstanding specifically limited. After this, in order to remove the solvent used in the washing process, the drying process is performed within a range of the volatilization temperature of the solvent.

Next, the dried solid is heat-treated at a temperature of 450 to 900° C. and a pressure of 1 to 90 bar for 0.5 to 10 hours under $N_2$ atmosphere. If the pressure is below than 1 bar, the sizes of the nanoparticles may be increased more than before the heat-treatment, thus allowing decreasing an active region. If the pressure exceeds 90 bar, the activity may be decreased due to the structural problem.

Further, if the temperature is below than 450° C. or exceeds 900° C., the stability of the nanoparticles may be decreased. Further, if the heat-treatment time exceeds 10 hours, the size of the nanoparticles may be increased, thus allowing decreasing the active region.

The average particle size of the core-shell nanoparticles obtained by the above method may be 3 to 5 nm, preferably 3 to 4.5 nm, the mass activity may be 0.52 to 1.22 A/mgPGM, and the specific activity may be 800 to 200 $\mu A \cdot cm^{-2}$.

Further, the core-shell nanoparticle may have the Half-wave potential of 910 to 930 mV. This is verified by Linear Sweep Voltammograms (LSV) around 30 k cycles of Accelerated Stress Testing (AST). At this time, the AST measures time for being repeated at a voltage of 0.6V for 3 seconds and 0.95V for 3 seconds respectively during 30K cycles, and the LSV is measured at a scan speed of 10 mV S-1 ND and a rotational speed of 1600 rpm in a potential range of 0.0 to 1.1V (vs. RHE) in $O^{2-}$ saturated 0.1 M $HClO_4$.

Hereinafter, preferable embodiments are provided in order to help understanding the present disclosure. However, the below-described embodiments merely instantiate the present disclosure, it would be apparent for those skilled in the art that various changes and modification are allowable within the scope and technical idea of the present disclosure, and it is no doubt that these changes and modifications belong to the accompanying claims.

Embodiment 1

A dispersion solution of Platinum(II) acetylacetonate (Pt (acac)$_2$, 97%, Sigma-Aldrich) 0.520 g, Iron (III) acetylacetonate (Fe(acac)$_3$, 99.9%, Sigma-Aldrich) 0.453 g and Carbon support (Vulcan XC-72, BET Surface area: 250 $m^2g^{-1}$, Particle size: 30-40 nm, Cabot Corporation) 0.675 g was added to $N_2$ purged (EG), followed by irradiating ultrasonic waves with a high intensity. At this time, the ultrasonic irradiation was performed for 3 hours using a horn-type ultrasonic processor (Sonic & Materials, VCX 750, Amplitude 40%, 13 mm solid probe and 20 kHz).

Following the ultrasonic irradiation, the resulted black slurry was filtered with a membrane filter (pore size: 0.4 μm), followed by washing the filtered sample with an excessive amount of ethanol and deionized water and finally drying the washed sample at a temperature of 70° C. in a vacuum oven all night long.

The dried sample was heat-treated at 510° C. and a pressure of 1 bar for 2 hours under $N_2$ atmosphere, using a high pressure furnace, thus manufacturing a core-shell nanoparticle (Fe@Pt/C_1 bar).

Embodiment 2

The embodiment 2 was performed in the same way as the above embodiment 1, but the dried sample was heat-treated at a pressure of 40 bar rather than 1 bar, thus manufacturing a core-shell nanoparticle ((Fe@Pt/C_40 bar).

Embodiment 3

The embodiment 3 was performed in the same way as the above embodiment 1, but the dried sample was heat-treated at a pressure of 80 bar rather than 1 bar, thus manufacturing a core-shell nanoparticle ((Fe@Pt/C_80 bar).

Embodiment 4

The embodiment 3 was performed in the same way as the above embodiment 1. However, Cobalt acetylacetonate (99.9%, Sigma-Aldrich) 0.453 g was used rather than Iron (III) acetylacetonate (Fe(acac)$_3$, 99.9%, Sigma-Aldrich) and heat-treatment was performed at 800° C. and a pressure of 1 bar for 3 hours under $N_2$ atmosphere, using the high pressure furnace, thus manufacturing a core-shell nanoparticle (Fe@Pt/C_1 bar).

Embodiment 5

The embodiment 4 was performed in the same way as the above embodiment 1. However, Cobalt acetylacetonate (99.9%, Sigma-Aldrich) 0.453 g was used rather than Iron (III) acetylacetonate (Fe(acac)$_3$, 99.9%, Sigma-Aldrich) and heat-treatment was performed at 800° C. and a pressure of 80 bar for 3 hours under $N_2$ atmosphere, using the high pressure furnace, thus manufacturing a core-shell nanoparticle (Fe@Pt/C 80 bar).

Comparative Example 1

Commercial Pt/C Catalyst (40 wt %, HiSPEC4000, Johnson Matthey)

Comparative Example 2

The comparative example 2 was performed in the same way as the above comparative example 1, but the dried sample was obtained as a core-shell nanoparticle (Fe@Pt/C) without any heat-treatment (no heat-treatment).

Comparative Example 3

The comparative example 2 was performed in the same way as the above comparative example 1, but Cobalt acetylacetonate (99.9%, Sigma-Aldrich) 0.453 g was used rather than Iron (III) acetylacetonate (Fe(acac)$_3$, 99.9%, Sigma-Aldrich), thus obtaining the dried sample as a core-shell nanoparticle (Fe@Pt/C) without any heat-treatment (no heat-treatment).

FIG. 1 depicts the X-ray diffraction (XRD) of the core-shell nanoparticles manufactured in embodiments 1 to 3 and comparative examples 1 to 2 according to the present disclosure, allowing verifying that all of them show the face centered cubic structure.

FIG. 2 depicts the transmission electron microscopy (TEM) showing the sizes of the core-shell nanoparticles manufactured in embodiments 1 to 3 and comparative example 2 according to the present disclosure, and the particle uniformity and dispersion thereof.

The results of the FIGS. 1 and 2 are as shown in table 1 below.

TABLE 1

| | Determinant size (nm)$^a$ | Particle size (nm)$^b$ | Pt—Pt distance (Å)$^a$ | Lattice constant (Å)$^a$ | The metal amount in the total content (wt %)$^c$ | |
|---|---|---|---|---|---|---|
| | | | | | Pt | Fe |
| Embodiment 1 | 3.8 | 4.2 ± 1.1 | 0.2727 | 3.858 | 24.9 | 5.0 |
| Embodiment 2 | 3.0 | 3.4 ± 0.6 | 0.2744 | 3.881 | 24.1 | 4.8 |
| Embodiment 3 | 2.7 | 3.1 ± 0.5 | 0.2753 | 3.895 | 24.0 | 4.9 |
| Comparative example 1 | 3.0 | — | 0.2781 | 3.923 | 40.0 | — |
| Comparative example 2 | 2.4 | 2.7 ± 0.4 | 0.2745 | 3.884 | 24.1 | 3.4 |

$^a$In the XRD(Rigaku, CuKα, λ = 1.54056540) pattern, a lattice parameter is calculated by using the Scherrer formula for Pt (111) peak, the lattice parameter is calculated by the method for least squares.
$^b$A particle size of 250NPs is obtained from the TEM(Tecnai G2 F30 S-Twin, 200 kV) image.
$^c$The metal amount in the total content is analyzed by ICP-AES(OPTIMA 4300DV Perkin Elmer).

As shown in the table 1, it was verified that the particles manufactured in embodiments 1 to 3 according to the present disclosure have an average size in a range of 3 to 5 nm, and contain Pt and Fe.

Further, FIG. 4 depicts the scanning transmission electron microscopy (STEM) and energy dispersive spectrometry (EDS) of the nanoparticles manufactured in embodiments 1 to 3 and the comparative example 2 according to the present disclosure, thereby verifying the core-shell structure.

FIGS. 5, 6 and 7 depict the result of electrochemical analysis, which was performed using a standard 3 electrode combined with a rotating disk electrode (RDE).

In particular, FIG. 5 depicts the specific activity, mass activity and electrochemically active surface area (ECSA) of the core-shell nanoparticles manufactured in embodiments 1 to 3 and comparative examples 1 to 2 according to the present disclosure. Further, FIG. 6 depicts the Linear Sweep Voltammograms (LSV) of the core-shell nanoparticles manufactured in embodiments 1 to 3 and comparative examples 1 to 2 according to the present disclosure around 30 k cycles of Accelerated Stress Testing (AST). At this time, the AST was performed by measuring time for being repeated at a voltage of 0.6V for 3 seconds and 0.95V for 3 seconds respectively during 30K cycles. The LSV for Oxygen Reduction Reaction (ORR) was measured at a scan speed of 10 mV S-1 ND and a rotational speed of 1600 rpm in a potential range of 0.0 to 1.1V (vs. RHE) in $O^{2-}$ saturated 0.1 M $HClO_4$.

Further, FIG. 7 depicts the specific activity and mass activity of the core-shell nanoparticles manufactured in embodiments 1 to 3 and comparative examples 1 to 2 according to the present disclosure around 30 k cycles of AST.

The results of the FIGS. 5 and 6 are as shown in table 2 below.

TABLE 2

| | Electrochemical surface area, (ECSA) ($m^2g^{-1}$PGM) | Mass activity (A/mgPGM) | Specific activity (μA · $cm^{-2}$) | Half-wave potential (mV) |
|---|---|---|---|---|
| Embodiment 1 | 57.56 | 1.067 | 1854.59 | 927 |
| Embodiment 2 | 73.75 | 0.737 | 999.92 | 918 |
| Embodiment 3 | 71.40 | 0.586 | 820.95 | 916 |
| Comparative example 1 | 48.57 | 0.226 | 466.19 | 895 |
| Comparative example 2 | 76.26 | 0.367 | 480.82 | 906 |

ECSA: a numerical value of (c) in FIG. 5
Mass activity: a numerical value of (d) in FIG. 5
Specific activity: a numerical value of (d) in FIG. 5
Half-wave potential: induced from Linear Sweep Voltammograms (LSV) in FIG. 6

As shown in the table 2, it was verified that embodiments 1 to 3 according to the present disclosure show superior mass activity, specific activity and half-wave potential compared to comparative examples 1 to. At this time, the Half-wave potential, as the analysis method of Oxygen Reduction Reaction (ORR) activity, means the potential in which a current becomes ½ of a diffusion limited current. The Half-wave potential values were drawn from the Linear Sweep Voltammograms (LSV) in FIG. 6.

Particularly, it was verified that embodiments 1 to 3 showed the superior mass activity and specific activity which were 2.6 to 4.7 times and 1.8 to 4.0 times increases, respectively compared to the comparative example 1. Further, it was also verified that even after 30 k of AST, the embodiments 1 to 3 still showed the superior mass activity and specific activity which were 2.8 to 4.4 times and 2.4 to 4.6 times increases, respectively compared to the comparative example 1 (FIG. 6).

In FIG. 6, as considering the change in the Half-wave potential according to changes in the cycle (fresh, 10 k, 20 k, 30 k), the comparative example 1 showed the Half-wave potential of −25 mV, while the embodiments 1 to 3 showed the Half-wave potential of −11 to −16 mV, thus verifying superior durability.

The above-described description merely instantiate the technical idea of the present disclosure, it would be apparent for those skilled in the art that various changes and modification are allowable within the scope and technical idea of the present disclosure, the protection scope of the present disclosure will be interpreted by the following claims, and it will be also interpreted that entire technical idea of the present disclosure is included in the patent right scope of the present disclosure.

The invention claimed is:

1. A method to control sizes of core-shell nanoparticles comprising the steps of:
    manufacturing slurry by irradiating ultrasonic waves to a dispersion solution containing a reducing solvent, a carbon support, a transition metal precursor and a platinum precursor;
    manufacturing a solid by filtering the manufactured slurry, followed by washing and drying; and
    manufacturing a nanoparticle of a transition metal core and a platinum shell by heat-treating the dried solid at a temperature of 450 to 900° C. and a pressure of 40 to 80 bar for 0.5 to 10 hours under $N_2$ atmosphere.

2. The method to control sizes of core-shell nanoparticles according to claim 1, wherein the transition metal is selected from the group consisting of nickel, manganese, chromium, copper, molybdenum, iron and cobalt.

3. The method to control sizes of core-shell nanoparticles according to claim 2,
wherein an average particle size of the core-shell nanoparticles is 3 to 4.5 nm.

4. The method to control sizes of core-shell nanoparticles according to claim 1,
wherein an average particle size of the core-shell nanoparticles is 3 to 5 nm, a mass activity is 0.52 to 1.2 A/mgPGM, and a specific activity is 800 to 200 $\mu A \cdot cm^{-2}$.

5. The method to control sizes of core-shell nanoparticles according to claim 1, wherein the core-shell nanoparticles have a Half-wave potential of 910 to 930 mV verified by Linear Sweep Voltammograms (LSV) around 30k cycles of Accelerated Stress Testing (AST),
the AST measures time for being repeated at a voltage of 0.6 V for 3 seconds and 0.95 V for 3 seconds respectively during 30K cycles, and the LSV is measured at a scan speed of 10 mV $S^{-1}$ and a rotational speed of 1600 rpm in a potential range of 0.0 to 1.1 V (vs. RHE) in $O^{2-}$ saturated 0.1M $HClO_4$.

6. The method to control sizes of core-shell nanoparticles according to claim 1,
wherein the reducing solvent has reducing power at a temperature of 70° C. or higher.

7. The method to control sizes of core-shell nanoparticles according to claim 1,
wherein the ultrasonic wave is performed for 2 to 4 hours, using a 13 mm solid probe and an ultrasonic processor with a frequency of 20 kHz.

\* \* \* \* \*